Nov. 15, 1949     R. H. GODDARD     2,488,287
APPARATUS FOR VACUUM TUBE TRANSPORTATION
Filed Oct. 6, 1945     2 Sheets-Sheet 1
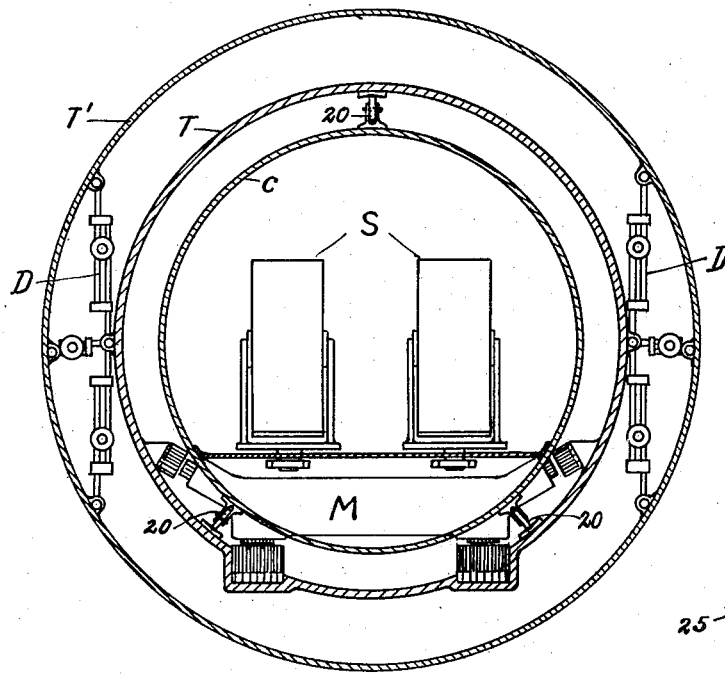
Fig. 1
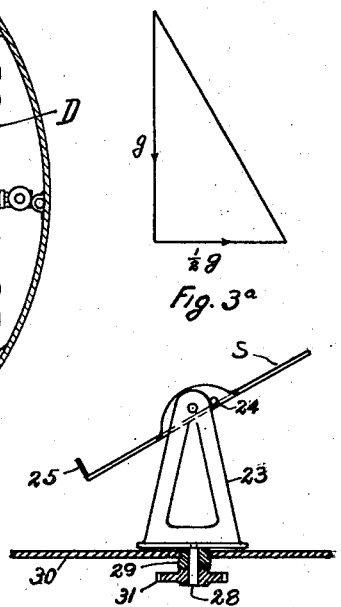
Fig. 3a
Fig. 3
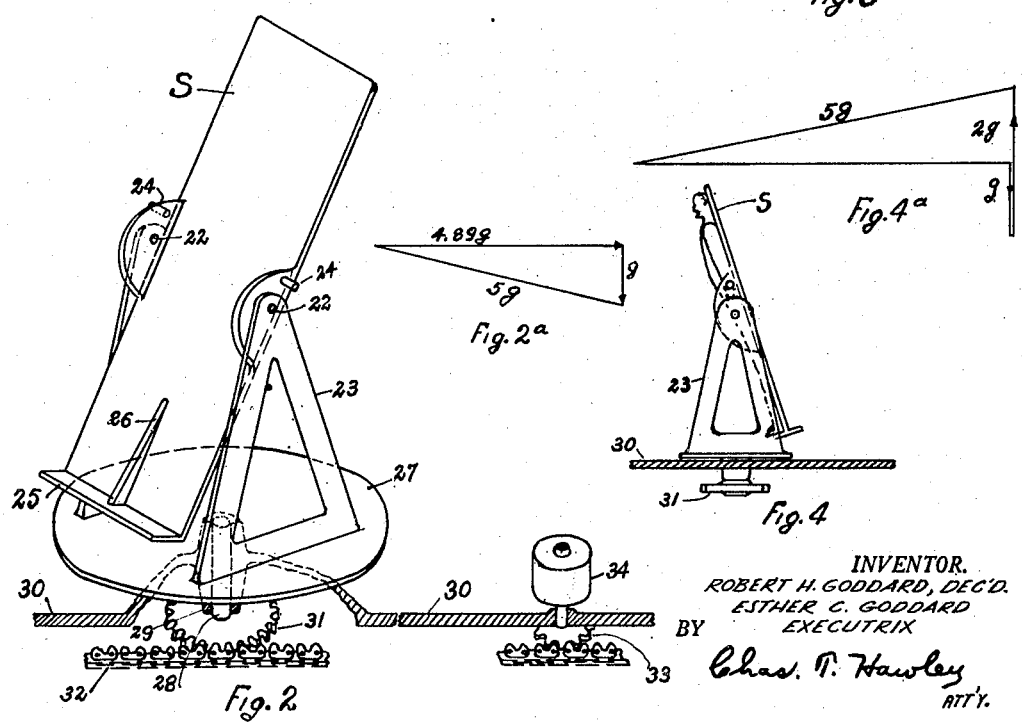
Fig. 2a
Fig. 2
Fig. 4a
Fig. 4
INVENTOR.
ROBERT H. GODDARD, DEC'D.
ESTHER C. GODDARD
EXECUTRIX
BY Chas. T. Hawley
ATT'Y.

Nov. 15, 1949      R. H. GODDARD      2,488,287
APPARATUS FOR VACUUM TUBE TRANSPORTATION
Filed Oct. 6, 1945      2 Sheets-Sheet 2

INVENTOR.
ROBERT H. GODDARD, DEC'D
ESTHER C. GODDARD,
BY      EXECUTRIX
Chas. T. Hawley
ATTY.

Patented Nov. 15, 1949

2,488,287

UNITED STATES PATENT OFFICE

2,488,287

APPARATUS FOR VACUUM TUBE TRANSPORTATION

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application October 6, 1945, Serial No. 620,825

3 Claims. (Cl. 105—345)

This invention relates to high speed passenger transportation and more particularly to means for safely and comfortably supporting passengers during such transportation.

This application relates to subject matter shown and described in a prior application by the same inventor, Serial No. 564,143, filed November 18, 1944, and is a continuation-in-part of said application.

It is the general object of the invention to provide improved means for supporting each passenger in the most desirable position for resisting the forces of acceleration and deceleration.

A further object is to provide means for supporting each passenger in a plane substantially perpendicular to the direction of the resultant acceleration or deceleration in the longitudinal or translational direction.

Means are also provided for reversing the passenger supports on a change from acceleration to deceleration.

Other features of the invention relate to means for conveniently adjusting the center of gravity of the passenger with respect to the pivotal bearing of the support, and to an improved and yieldable passenger-supporting structure.

The invention further relates to arrangements and combinations of parts which will be hereinafter described and more particularly pointed out in the appended claims.

Preferred forms of the invention are shown in the drawings, in which

Fig. 1 is a transverse sectional view of transportation apparatus embodying the invention;

Fig. 2 is a perspective view, partly in section, of a passenger support and associated mechanism;

Figs. 3 and 4 are side elevations, partly in section and showing the passenger support in different positions;

Figs. 2a, 3a and 4a are force diagrams associated with Figs. 2, 3 and 4 respectively;

Figure 5:
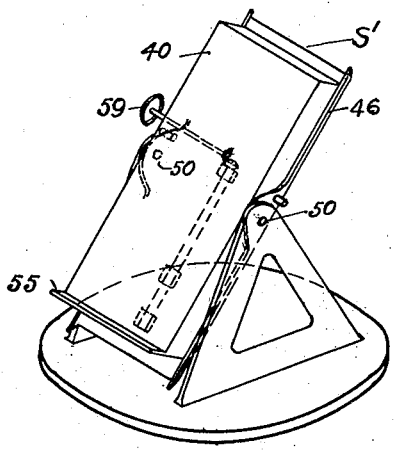
Fig. 5 is a perspective view of a modified passenger support.
Figure 6:
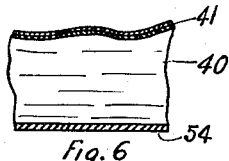
Fig. 6 is a detail cushion section to be described.
Figure 7:
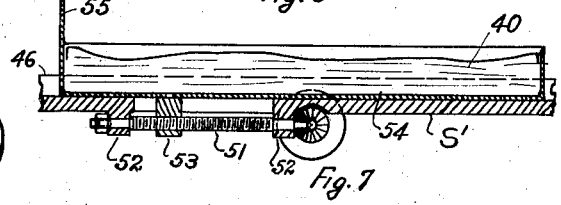
Fig. 7 is a longitudinal section of parts of the support shown in Fig. 5.
Figures 8, 9:
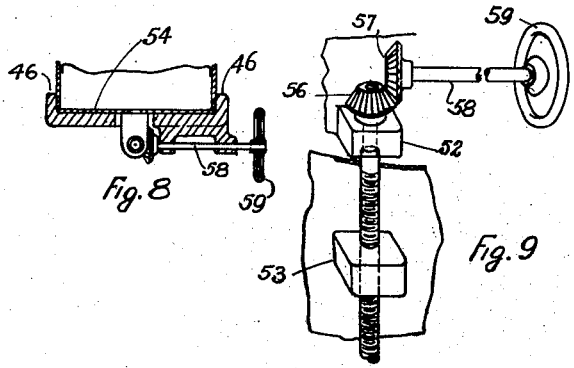
Fig. 8 is a transverse section of said parts.
Fig. 9 is a perspective view of certain adjusting mechanism.

Referring to Fig. 1, I have shown a car C mounted in a transportation tube T. The tube T may, is desired, be supported in an outer tube T' and may be adjustably aligned therein by means of special adjusting devices D. Guide rolls 20 limit transverse and upward displacement of the car in the tube T, and electro-magnetic or oscillator apparatus M is provided for lifting and driving the car. The tube T is maintained under a high vacuum to eliminate air friction.

The parts thus far described form no part of the present invention and for a more complete description, reference is made to the original application above cited.

For the time of transit in such a high speed transportation system to be a minimum, the acceleration of the car C during the first half of the journey and the deceleration during the last half should be such that the vector sum of all the accelerations or decelerations at any given time will be not greater than can be borne with comfort by the passengers for the period of application.

When the tube is laid as straight as possible and on a great circle of the earth, the essential component accelerations would be four in number, namely, the acceleration of gravity, the acceleration or deceleration along the path of travel, the acceleration produced by the curvature of the path in a vertical plane, and the sidewise acceleration of Coriolis, due to rotation of the earth.

The accelerations due to horizontal or vertical curvature should be maintained moderate for that part of the travel where the velocity is very high, which implies keeping a large radius of horizontal curvature at the middle portion of the path travelled.

The longitudinal forces encountered in a level tube comprise the forces necessary to give the car a desired acceleration or deceleration. In the case of a large force of acceleration or deceleration, the physiological effect on a passenger will be least if no part of the body is far forward of any other part, that is, if the hydraulic head is nowhere excessive.

Passenger supports S are provided and preferably have in the form shown in Fig. 2, the support being shown in position for a forward acceleration sufficient to make the total acceleration 5 g's, it being assumed that there is no sidewise acceleration. These supports have no seats, in order to reduce the hydraulic head of all parts of the body to a minimum.

A forward or horizontal acceleration of 4.89 g's (Fig. 2a) would make the time of transit from Boston to New York (200 miles) 2 minutes 46 seconds, and from New York to San Francisco (2500 miles) 10 minutes, 4 seconds. This results in a total force of 5 g's acting on the passenger, which is assumed to be the maximum acceleration that can be borne with comfort and safety over a considerable period of travel.

The supports S (Fig. 2) are made automatically adjustable for angle by being suspended at points 22 forward of their backs on standards 23, so that the center of gravity of the passenger and of the back support lies in the direction of the resultant longitudinal force through the axis containing the support points 22. Stops 24 are provided to prevent the supports from assuming too nearly a horizontal position and interfering with each other. A foot rest 25 is provided, adjustable for height along a slot 26 in the support S so that the center of gravity of each passenger may be located in a plane through the pivot points 22 and at right angles to the back.

The standards 23 are secured on bases 27 turnable with shafts 28 mounted in bearings 29 in the floor or platform 30 of the car. They are arranged to be rotated simultaneously at the middle of the journey, so as to face in the reverse direction. For this purpose, gears 31 on the shafts 28 are engaged by a chain 32 shiftable by a gear 33 turned by a small motor 34 located on the floor of the car. The chain 32 may engage any number of gears 31, so that a single motor 34 may be used to reverse all of the supports S in a car.

In Figs. 3 and 3a is shown the inclination of the support S for an acceleration of ½ g, the stops 24 being set for this acceleration as a lower limit. It is however quite possible for passengers to withstand such a low translational acceleration (not over ½ g) while seated in ordinary chairs equipped with suitable head rests.

Figs. 4 and 4a illustrate the support S positioned for an upward centrifugal force equal to 2 g's and a total resultant acceleration of 5 g's. In this case, the resultant acceleration will be above the horizontal.

When the acceleration due to curvature in a vertical plane with the center of curvature downward is more or less equal to the acceleration of gravity, very little lifting or depressing force will be required. The lifting force may remain negligible over a considerable time interval if the curvature is that of the earth's surface.

In order for the time of transit to be a minimum, the acceleration borne by the passengers should be about 5 g's, more or less, depending on the duration of the journey.

Figure 14:
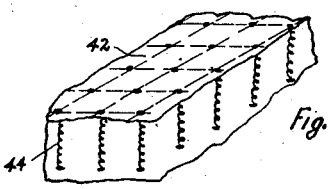
Fig. 14 is a perspective view of a portion of a cushion.

In Figs. 5 to 9 is shown a modified passenger support S' which is provided with a liquid-filled cushion or pad 40. For extreme flexibility, the top of the pad may be made of several thin and superposed layers 41 (Fig. 6) of rubber, silk or other suitable material. A loose reenforcing net 42 (Fig. 14) is desirable to limit distention at any point and to prevent possible rupture of the top or cover.

Figure 13:
Fig. 13 is a view similar to Fig. 6 but showing a modified cushion structure.

In order to limit the distention, yielding elements 44 may also be provided connecting the back and front faces of the cushion. These elements may be in the form of spiral springs, as shown in Fig. 13, and are desirably anchored at their top ends to the intersections of the net 42.

By means of the above-described cushion, parts of the passenger which sustain a pressure head up to 6" or 8" are backed by the hydrostatic pressure of water or other fluid having substantially the same head. The necessity of using special elastic, or pressurized suits is thereby avoided. Moreover, the thrust produced by the high acceleration is borne over large surfaces and the blood circulation is improved over what it would be if the support were over relatively small areas only and on an unyielding surface. The cushion 40 is guided longitudinally by flanges 46 on the sides of the support S'.

Improved means are also provided for adjusting the center of gravity of each passenger relative to the pivots 50 of the support S'. For this purpose is provided a screw 51 rotatable in bearings 52 (Fig. 7) on the support S' and coacting with a nut 53 on the back casing 54 of the cushion 40. A foot-rest or step 55 forms the lower end of the back casing. Bevel gears 56 and 57 (Fig. 9) connect the screw 51 with a cross shaft 58 having a hand wheel 59.

By turning the wheel 59, the cushion 40 may be adjusted longitudinally to bring the center of gravity of each passenger in a plane perpendicular to the support S' at the pivots 50, which is the desired position for maximum comfort.

Figure 10:
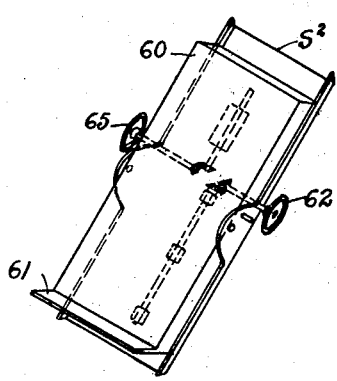
Fig. 10 is a perspective view of a further modification of the passenger support.
Figure 11:
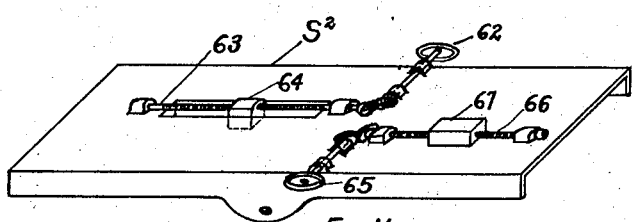
Fig. 11 is a rear perspective of certain parts thereof.
Figure 12:
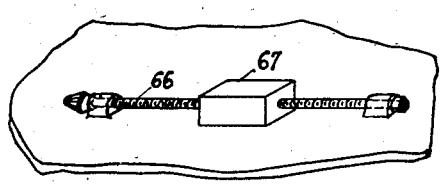
Fig. 12 is an enlarged perspective view of certain operating parts to be described.

In Figs. 10 to 12 has been shown a further modified support S2 in which a cushion 60 and step 61 may be adjusted longitudinally by a hand wheel 62 actuating a screw 63 and nut 64 as above described.

A second hand wheel 65 is connected by a cross shaft and bevel gears to a second screw 66 by which a counterweight 67 may be moved longitudinally.

With this arrangement, a rough longitudinal adjustment of the cushion and step determined by the passenger's height can be made before starting and a finer adjustment may be made during passage by shifting the counterweight. The counterweight is much lighter than the cushion, so that the latter adjustment is more easily made and may be made by the passenger himself.

Having thus described the invention and the advantages thereof, it is not wished to be limited to the details herein disclosed, otherwise than as set forth in the claims, but what is claimed is:

1. In a transportation apparatus a car, a passenger support in said car comprising a back-supporting portion, a frame on which said support is pivoted to swing about a horizontal axis parallel to said back-supporting portion but substantially forward of said support, a foot rest on said support for said passenger, a nut associated with said foot rest, a screw mounted on said support and effective to move said nut, and means to turn said screw to adjust said nut and foot rest lengthwise of said support.

2. In a transportation apparatus, a passenger support in which a passenger is supported in full length straight-line position, a frame on which said support is pivoted to swing about a horizontal axis approximately opposite to but substantially forward of the center of gravity of the passenger, a foot rest associated with said support, and means to move said foot rest to shift the center of gravity of the passenger longitudinally of said support.

3. In a transportation apparatus, a passenger support in which a passenger is supported in full length straight-line position, and a frame on which said support is pivoted to swing about a horizontal axis, said support comprising a back, a cushion slidable longitudinally of said back, a foot rest on said cushion, and means to shift said cushion and foot rest longitudinally on said back.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 601,000 | Garey et al. | Mar. 22, 1898 |
| 624,638 | Fournier | May 9, 1899 |
| 992,671 | Kester | May 16, 1911 |
| 2,057,687 | Mason | Oct. 20, 1936 |
| 2,135,230 | Courney | Nov. 1, 1938 |
| 2,304,781 | Dillon | Dec. 15, 1942 |